United States Patent [19]

Stephens

[11] 4,057,881
[45] Nov. 15, 1977

[54] MACHINE TOOL APPARATUS

[76] Inventor: Richard G. Stephens, 3414 Hickory Lane, Binghamton, N.Y. 13903

[21] Appl. No.: 657,078

[22] Filed: Feb. 11, 1976

[51] Int. Cl.² .................. B23B 3/18; B23B 39/20
[52] U.S. Cl. .............................. 29/27 C; 29/36; 29/40; 408/35
[58] Field of Search ....................... 29/39–42, 29/36, 46, 47; 192/85 C; 408/35

[56] References Cited
U.S. PATENT DOCUMENTS

| | | | |
|---|---|---|---|
| 2,686,995 | 8/1954 | Paredes | 29/40 X |
| 2,859,644 | 11/1958 | Watts | 408/35 X |
| 2,952,170 | 9/1960 | Hansen et al. | 408/35 X |
| 2,953,046 | 9/1960 | Jones | 408/35 X |
| 2,956,454 | 10/1960 | Hansen | 408/35 X |
| 3,845,532 | 11/1974 | Smith | 408/35 X |

Primary Examiner—Othell M. Simpson
Assistant Examiner—Z. R. Bilinsky

[57] ABSTRACT

Turret-carried tools on a lathe having an automatically indexable and translatable turret are powered and controlled through coupling devices which are selectively engaged by mating coupling devices extended and retracted from a power coupling assembly translatable with the turret.

34 Claims, 18 Drawing Figures

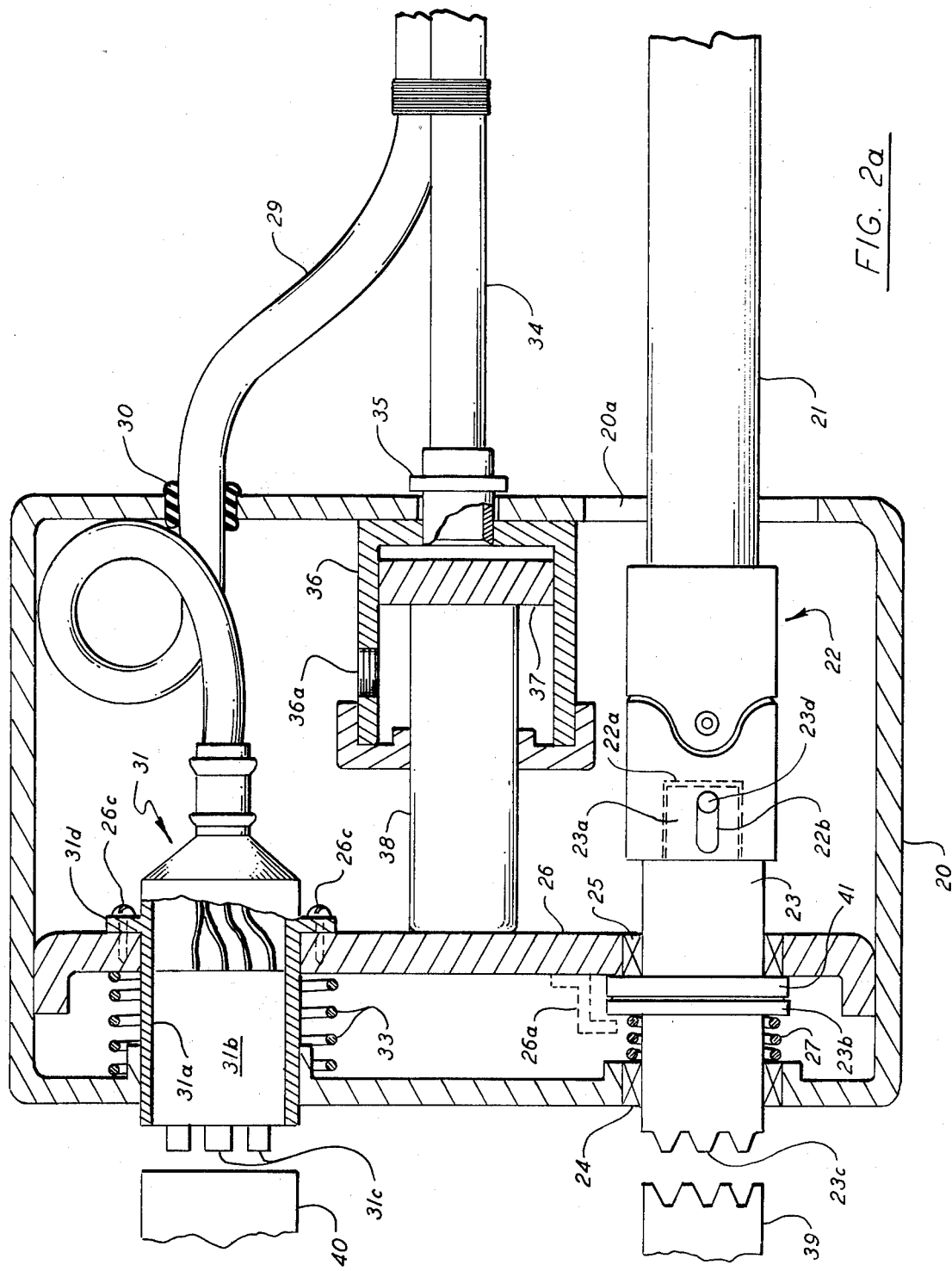

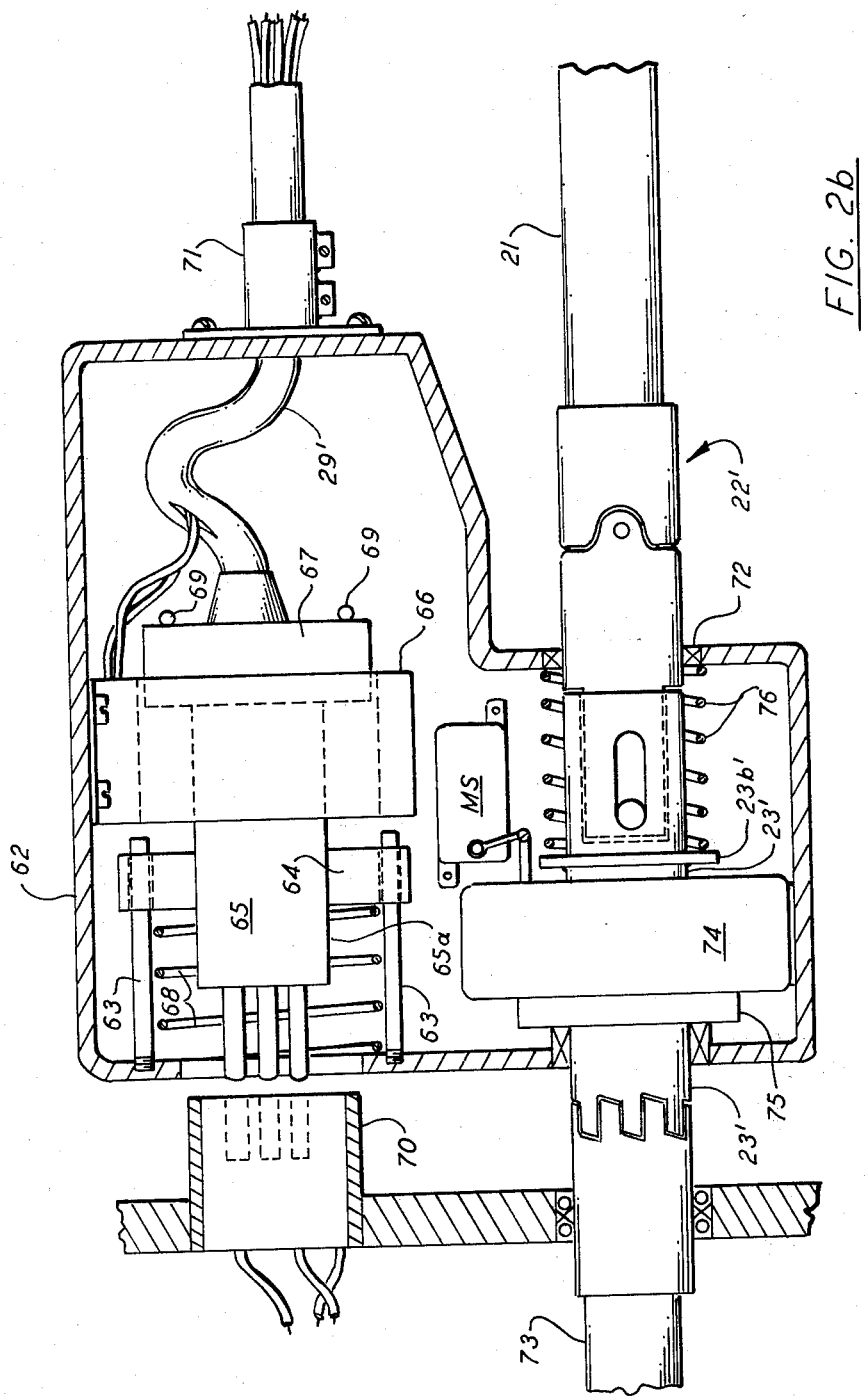

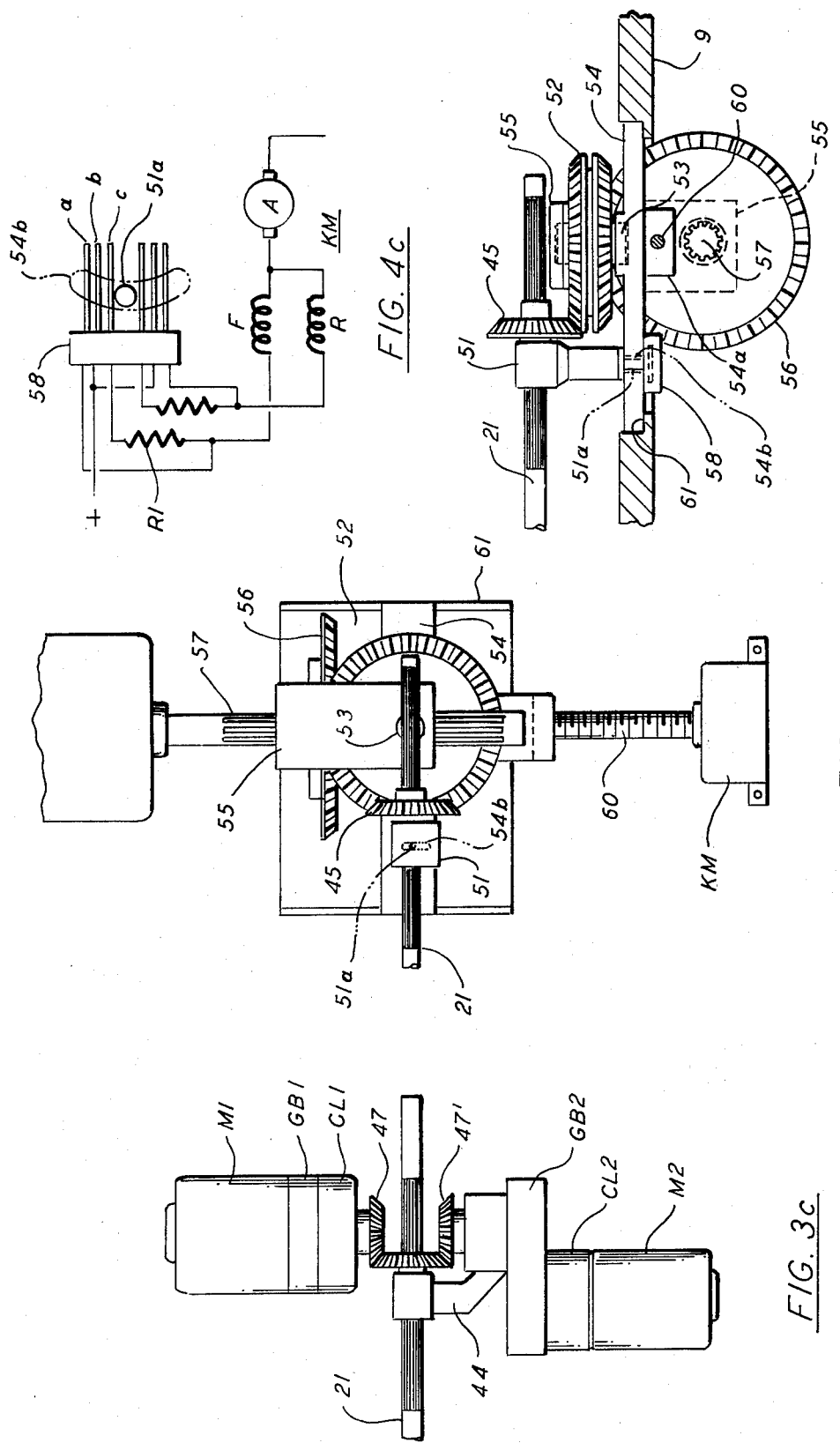

MACHINE TOOL APPARATUS

This invention relates to machine tools, and more particularly, to turret lathes incorporating improved means for supplying operating power successively to a multiplicity of tools carried on a rotatable turret. Production of many machined parts requires a variety of successive operations, such as turning, grinding and milling, to be performed on a workpiece, preferably using some form of automatic or numerical control of successive operations. Productivity and precision can be materially increased if transfer to and setup of a workpiece in successive machines can be reduced or avoided by enabling a turret to perform a larger number of different types of machining operations. Thus one object of the present invention is to provide improved turret lathe apparatus in which a larger number of different operations may be performed on a workpiece than with many prior turret lathes. It is known that a wider variety of machining operations can be performed if some or all of the tools carried on the turret of a turret lathe can be powered, so as to rotate or reciprocate, for example, and thus a more specific object of the present invention is to provide improved means for applying power to turret-carried tools.

Various arrangements for selectively connecting power to tools carried on a turret are known. U.S. Pat. No. 3,845,532 discloses a lathe wherein various tools carried on the turret may be driven by a motor carried with the turret on a two-coordinate table. The requirement that a motor be carried on the turret is disadvantageous in the case of large motors having substantial horsepower, and the special form of turret shown in the mentioned patent makes installation of the system disclosed in the patent in various existing lathes unduly expensive. Thus one further object of the invention is to provide improved turret lathe apparatus wherein power may be relatively coupled to various turret-carried tools without a requirement that a motor be carried with the turret, and another object is to provide an arrangement of that nature which can be conveniently added to and utilized on many existing turret lathes without requiring radical changes in their existing structures.

The broad concept of connecting power to turret-carried tools from a motor not carried on the turret is not per se new. It has been previously suggested that power be selectively coupled to tools of turret carried on a two-coordinate table by translating the turret to a predetermined position, so that a first coupling half carried on the turret and connected to drive a turret-carried tool will attach to and be drivingly engaged with a second coupling half removably mounted on support means adjacent the predetermined position. The second coupling half is connected to a motor mounted on the base of the machine by one or another of several types extensible, retractable and flexible motion-connecting mechanisms. After the turret is translated to connect the first and second coupling halves, it is translated back toward the machine headstock and workpiece to perform a machining operation, with the turret tool being powered by the motor through the flexible motion-connecting mechanism, and when the machining operation has been completed, the turret is again translated to the mentioned predetermined coordinate position to disengage the two coupling halves, leaving the second coupling half seated on the support means so that it may later be engaged by another coupling half carried on a different face of the turret. Inasmuch as connection and disconnection of power to the turret-carried tools is accomplished by moving the turret in two coordinates to a predetermined or "home" position, this previously-suggested system may appropriately be referred to as a "homing connection" system. One important object of the present invention is to provide improved turret lathe apparatus wherein power from a motor mounted on the machine base may be selectively connected to and disconnected from tools carried on a turret translatable in two directions without a requirement that the turret be translated to some predetermined location in order to effect a coupling or uncoupling of power. With such an arrangement much less travel of the turret in the two coordinate directions is required, so that successive operations with successive turret faces may occur more rapidly, and less wear of the turret table drive equipment will occur. Numerical control programming is also considerably simplified for many applications, since various of the program steps which the homing connection requires to connect and disconnect power may be eliminated.

The homing connection system also tended to require the use of relatively expensive coupling devices, which become subject to wear after many coupling and uncoupling operations, and if an erroneous X-coordinate position were to exist during an attempted coupling operation, substantial damage to the system could occur. In fulfillment of two further objects of the present invention, less expensive power coupling devices may be used, and since power coupling and uncoupling operations do not require a specific position of the turret, the mentioned form of damage cannot occur.

One reason the mechanical coupling means proposed for use with the homing connection system tend to be expensive is that such coupling means are required to receive and resist both compression and tension. By use of the present invention, one can couple rotary mechanical power to a turret-carried tool using coupling means which need merely receive and resist compression, which allows coupling devices of much simpler construction to be used, and provision of such an arrangement is a further object of the invention. As well as being expensive, the detachable shaft coupling means used with the proposed homing connection system were required to rotate at an appreciable speed so that certain centrifugal forces would assist connection and disconnection. This requires that a drive motor be started before the coupling means could be engaged and that it continue to rotate until after disengagement occurred. Another object of the present invention is to avoid these requirements. The homing connection system also requires the use of various clamping means to maintain various coupling halves aligned and fixed at predetermined positions when they are not being used, so that they can later be coupled. Another object of the present invention is to provide means for coupling power to turret-carried tools which does not require the use of such clamping means. The detachable shaft coupling devices used with the homing connection system are difficult to construct in a manner such that their rotary engagement is free from substantial back-lash. While the presence of substantial backlash in the connection of rotary input power to a turret is of no significance in many applications, additional machining operations become feasible if power can be connected to a turret-carried device with a connection having very little backlash, and provision of such an arrangement is another object of the invention.

Other objects of the invention will in part by obvious and will in part appear hereinafter.

The invention accordingly comprises the features of construction, combination of elements and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which:

FIG. 1b is a side elevation view taken at lines 1b—1b in FIG. 1a.

FIG. 1c is a diagrammatic end view taken at lines 1c—1c in FIG. 1a.

FIG. 2a is a downward cross-section view illustrating one exemplary form of power-coupling assembly according to the invention.

FIG. 2b is a downward cross-section view illustrating one alternative form of power-coupling assembly according to the invention.

FIG. 3c is a side elevation view illustrating one modified form of power-connection means.

FIGS. 4a and 4b are top and side elevation views, respectively, illustrating a further form of power-connection means according to the invention, and FIG. 4c is an electrical circuit diagram illustrating one manner in which the power-connection means of FIGS. 4a–4b may be controlled.

FIG. 6b is a view taken at lines 6b—6b in FIG. 6a.

Figure 1A:
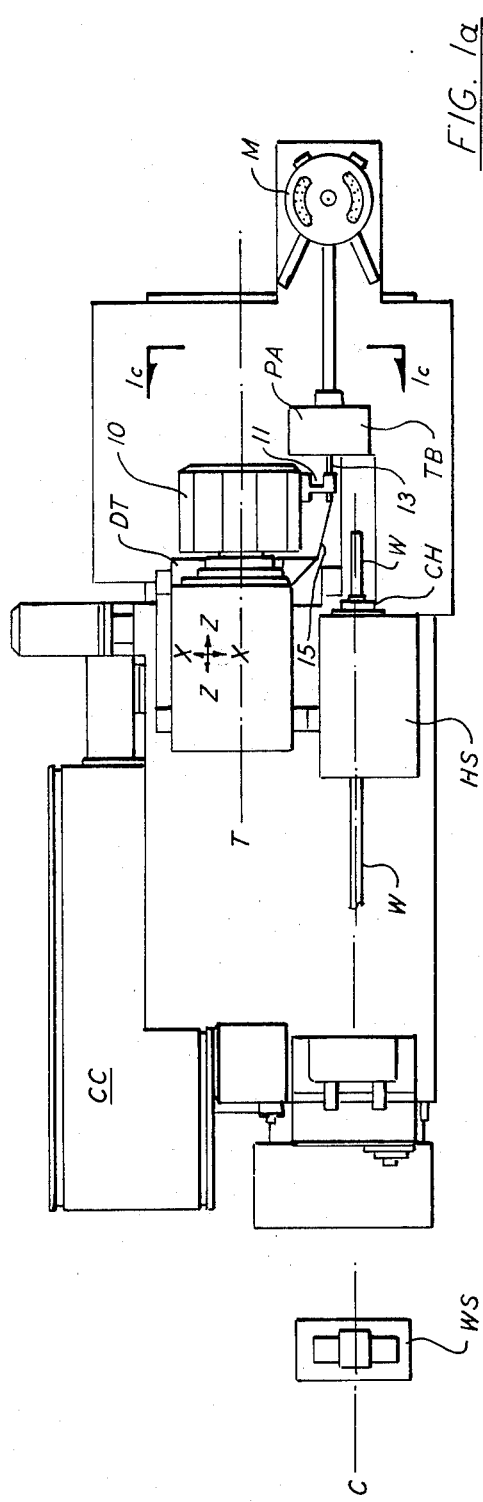
FIG. 1a is a plan view generally illustrating one form of the present invention applied to a known form of turret lathe.
Figure 1B:
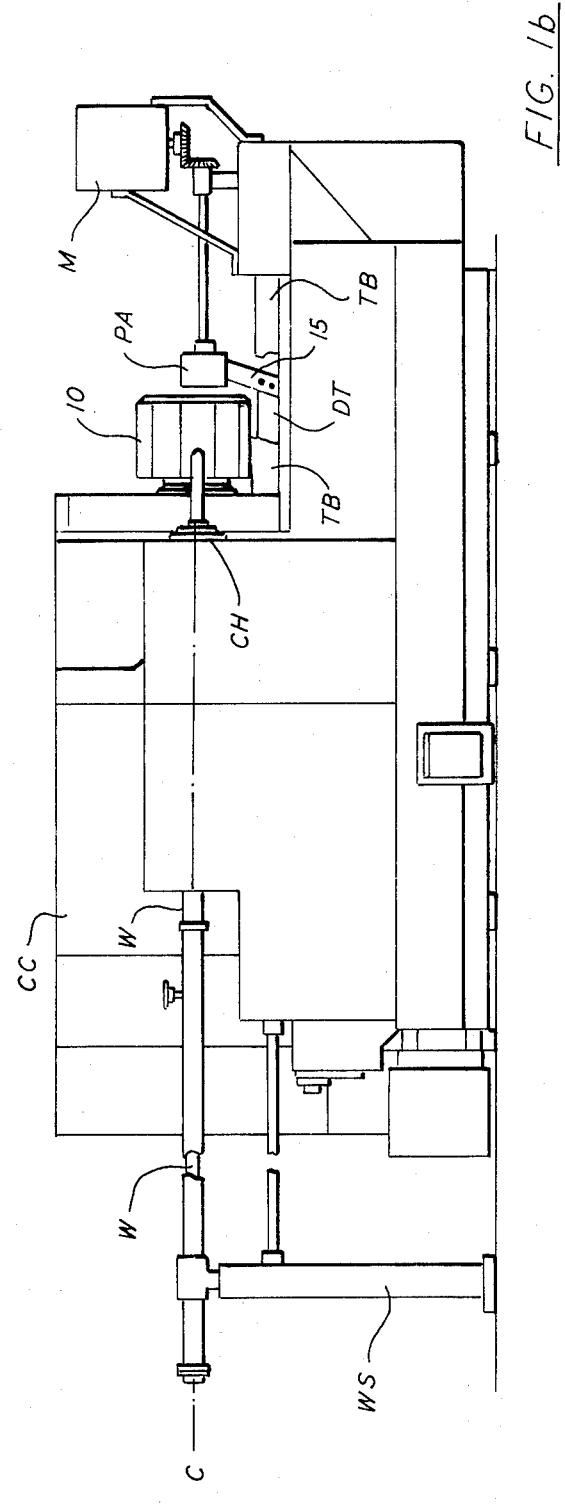

Referring to FIGS. 1a and 1b, a known form of turret lathe (such as the Model 1-SC sold by Warner and Swasey Corporation of Cleveland, Ohio) includes a headstock assembly HS having a powered main or headstock spindle carrying a chuck or collet CH which grips and rotates an elongated workpiece W, such as a piece of bar stock, about a main spindle axis labelled C. The outer end of workpiece W is shown supported by a conventional support WS. Means (not shown) are provided to retract the chuck jaws from the workpiece so that a known form of bar puller may advance the workpiece along the C axis. The rotation of the chuck and workpiece about the main spindle axis is sensed by a known form of shaft rotation encoder. A multifaced turret 10 is mounted for rotation about an axis T which extends parallel to axis C at the same vertical level as axis C. The direction in which axes C and T extend is termed the Z direction, and movement away from the headstock will be termed the positive Z direction. Turret 10 may be provided with twelve faces, for example, on any of which one or more tools may be fixedly bolted in a respective tool holder, and by indexing turret 10 about axis T in one or more increments of 30°, any of the tools may be presented to the workpiece. A turret face or a tool carried thereon will be said to be in "working position" when it has been indexed to face the workpiece. Turret 10 is carried on a two-coordinate servo-controlled drive table DT, so that turret 10 may be advanced toward or retracted away from workpiece W in a direction perpendicular to the Z direction which is indicated as X in FIG. 1a, and so that turret 10 may be translated along the length of the workpiece, in the Z direction. In a typical arrangement using the mentioned commercially-available machine, the total motion of turret 10 in the cross-feed or X direction may be of the order of 4 inches, and the total motion of the turret in the Z direction about 8 inches. A bar TB upon which a tailstock (not shown) may be mounted for "between-centers" operations extends in the Z direction generally below the main spindle axis. Rotation of the main spindle and translation of the turret drive table DT in the X and Z directions is controlled by numerical-control equipment housed in cabinet CC.

A plurality of tool holders 11 of known type may be bolted to respective faces of turret 10. Each tool holder 11 may be provided with a through bore. Various forms of rotatable tools may be mounted in the bores of the tool holders or otherwise mounted on the various turret faces at predetermined positions relative to the turret faces. Each tool desired to be mechanically driven from a motor fixed on the machine base is provided with a spindle 13 (FIG. 1a) which extends rightwardly a short distance from its respective tool holder. Some or all of the tool holders also may carry electrical, hydraulic or pneumatic coupling halves.

In accordance with the invention, a rigid arm 15 extends from the drive table DT to support a power coupling assembly PA, so that assembly PA moves together with the turret in the X and Z directions, with a fixed spacing between turret 10 and assembly PA. Power coupling assembly PA carries one or more power coupling devices which are rendered translatable a short distance with respect to turret 10 by an actuator means carried in assembly PA, in order to connect power to a tool carried on a given turret face. Power coupling assembly PA may in essence be permanently connected to one or more power sources fixed to the machine base, by one or more extensibe (and retractable) and flexible power connection means. As will be seen below, the power-coupling devices carried on assembly PA may make either mechanical, electrical, hydraulic or pneumatic connections to coupling halves carried on turret 10, and the flexible power connection means may include various mechanical shaft arrangements, electrical cables or hydraulic or pneumatic hoses.

Figure 1C:
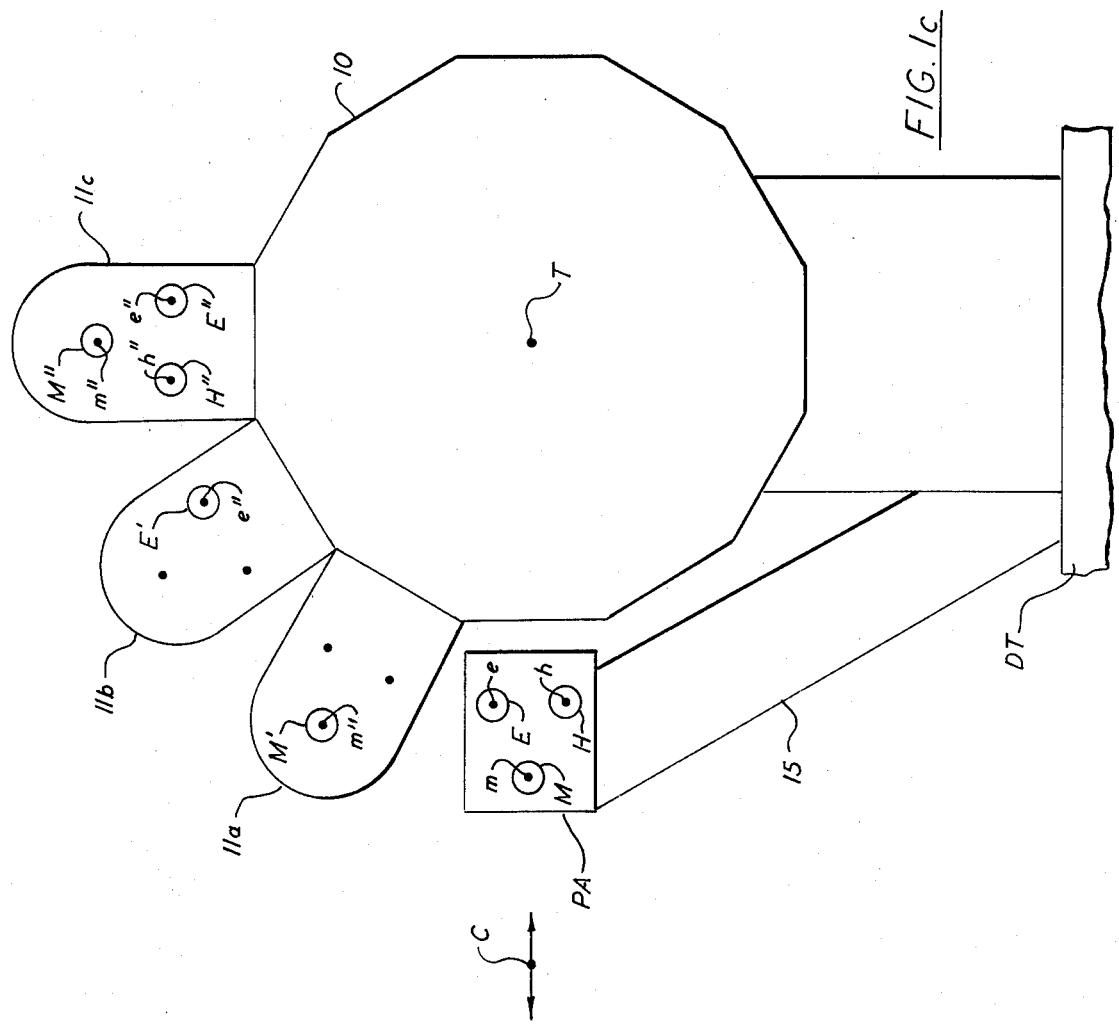

In FIG. 1c turret 10 is shown carrying tool holders 11a, 11b, 11c mounted on three faces of the turret, and similar tool holders (not shown) may be mounted on the other faces of the turret. Arm 15 extending from the two-coordinate table DT locates assembly PA so that axes m, h and e of three coupling devices M, H and E carried in assembly PA are spaced at predetermined positions relative to the indexing axis T of turret 10. The main spindle and workpiece axis C is shown by a double-ended arrow in FIG. 1c, since the distance between axes T and C will vary with the X position of the turret, but axes m, e and h are fixed relative to the turret axis because assembly PA moves with the turret. One or several coupling halves may be affixed to the tool holder on each face of the turret. When tool holder 11a is indexed to working position, the axis m'' of a mechanical coupling half M' carried in tool holder 11a will coincide with axis m, if holder 11b is indexed to working position, the axis e'' of an electrical coupling half E' is carried in tool holder 11b will coincide with axis e, and if tool holder 11c is indexed to working position, the axes m'', e'' and h'' of a mechanical coupling half M'', an electrical coupling half E'', and a hydraulic coupling half H'' all will coincide, respectively, with axes m, h and e of the assembly PA. Actuator means (not shown in FIG. 1c) are provided in assembly PA to extend coupling devices M, H and E a short distance in the Z direction toward whichever tool holder is in working position. Thus if tool holder 11a is in working position, operation of the actuator will cause mechanical coupling device M to be extended to connect rotary shaft power to mechanical coupling half M', but if tool holder 11c is in working position, operation of the actuator will cause mechanical, electrical and hydraulic power to be connected simultaneously to coupling halves M'', E'' and H'', respectively. The actuator need only move the coupling devices M, E and H a very short distance, say of the order of one inch, so that once the turret is indexed, power can be connected to one or more coupling halves then in working position substantially instantaneously. Also, power can be disconnected substantially instantaneously by retraction of the actuator. Importantly, the turret need not be translated in the X or Z directions in order to effect a coupling or uncoupling, so that wear of the drive table positioning equipment is materially decreased and successive machining operations can be performed more rapidly.

While the e and h axes are shown spaced at different vertical levels than the m axis, that is not an absolute requirement, and while the m axis is shown at the same vertical level as the T and C axes that also is not an absolute requirement. While devices 11a-11c in FIG. 1c have been termed tool holders and shown as resembling conventional tool holders commonly bolted to such turret faces, and while some or all of them may carry tools in various applications of the invention, one may note that as thus far described, they serve as coupling-half holders, each one serving to position one or more coupling halves on one of the three axes (m, e or h) when its associated face is indexed to working position.

In FIG. 2a one form of power-connecting assembly PA constructed according to the invention is shown as comprising a housing 20 into which shaft 21 extends through a slot 20a to connect to the rear half of a conventional Hookes U-joint coupling 22. The front half of coupling 22 is shown as including a square (or other non-circular) recess 22a into which a square boss 23a on the rear end of shaft 23 slidingly extends. A pin 23d staked in boss 23a rides in slots such as 22b in coupling 22, so that a rightward pull on shaft 21 will not remove boss 23a from recess 22a. Shaft 23 includes an integral flange 23b and engaging means shown in FIG. 2a as comprising a toothed front end 23c. Shaft 23 is slidingly and rotatably carried in bearings 24,25 in housing 20 and a plate 26. Spring 27 acts between the housing and flange 23b to urge shaft 23 and plate 26 rightwardly in FIG. 2a. An electrical cable 29 extends through grommet 30 in the rear of the housing to an electrical connector 31, which comprises a generally-cylindrical shell 31a having a plastic insulating plug 31b supporting contact prongs 31c to which the wires of cable 29 are connected. Connector 31 also includes an annular flange 31d affixed to plate 26 by screws 26c. Spring 33 urges plate 26 rightwardly in FIG. 2a. A hydraulic (or pneumatic) hose 34 is connected by fitting 35 to a cylinder 36 in which piston 37 is carried. A shaft or rod 38 connected to piston 37 butts against plate 26. When hydraulic (or pneumatic) pressure is applied to hose 34, it will be seen that the piston will move plate 26 leftwardly in FIG. 2a against the force of springs 27 and 33, until the ends of plate 26 strike the end of housing 20, and thus application of pressure to hose 34 will cause connector 31 and shaft 23 to extend a short distance from housing 20. In FIG. 2a the ends of a mating mechanical coupling and a mating electrical coupling which are carried on one face of turret 10 are partially shown at 39 and 40, and it will be understood that as shaft 23 and connector 31 are moved leftwardly, they will engage couplings 39 and 40 to apply mechanical and electrical power to the turret face on which couplings 38 and 40 are carried. It is to be remembered that housing 20 of assembly PA is mounted for X and Z travel with turret 10, so that whenever the turret face carrying connectors 39 and 40 is indexed to working position, shaft end 23c always will lie a predetermined short distance from mating connector 39, and connector 31 will always lie a predetermined short distance from connector 40, regardless of the instantaneous X and Z positions of the turret. If housing PA is mounted near the rear (tailstock side) face of the turret, or if connectors 39 and 40 extend substantially rearwardly from that face of the turret, it will be appreciated that piston 37 need only move a short distance, typically of the order of one inch, or perhaps even less, in order to mate coupling 39 with shaft end 23c and connector 31 with connector 40. It is to be understood that pressure may be applied to and removed from hose 34 by one or more valves (not shown) automatically controlled by the numerical control program. Shaft 21 is rotated by means to be described and hence rotary mechanical power may be applied to connector 39 to power a tool on the turret, and connectors 31 and 40 may apply electrical power to a motor or other electrical device carried on the turret, or may route various control signals to and from various transducers or other devices carried on the turret. A thrust bearing 41 is shown provided between flange 23b and plate 26, and a similar bearing (not shown) could be provided between spring 27 and flange 23b, if desired, to decrease wear as shaft 23 rotates. It will be recognized as the description proceeds, that as the turret is driven X and Z directions to perform a machining operation, that cable 29, hose 34, and coupling 22 will flex somewhat, and that shaft 21 will extend at varying angles through slot 20a.

When pressure is removed from hose 34, the force of springs 27 and 33 will move piston 37 rightwardly, expelling fluid (or air) from cylinder 36. Cable 29 is shown provided with a loop of slack within housing 29, so that if piston 37 moves connector 31 leftwardly very rapidly, a jerk will not be transmitted to the other end of the cable, which is routed to a spring-operated retractable reel, as will be seen below. The sliding connection shown between shaft 23 and U-joint coupling 22 may be provided for generally similar reasons, i.e. so that piston 36 need not pull shaft 21 when it operates to engage coupling parts 23c and 39. It is important to note that because the assembly PA is held a fixed distance from the turret 10 by arm 15, the connection made between devices such as 23c and 39, or between devices 31 and 40 need not be capable of resisting tension. In the homing connection system previously proposed, spring detent means and/or a tight friction fit were sometimes necessary between connectors of the nature of 31 and 40 to avoid an accidental uncoupling, if for example, the turret were translated suddenly in the negative direction, applying increased tension to a cable, which like cable 29, extends to a spring-operated retractable reel. The tension on the cable depends upon the tension applied by the reel, and too little tension can allow the cable to interfere with other devices, but the use of increased tension requires stronger detent means or a tighter friction fit between connectors 31 and 40, both of which are undesirable. Perhaps more importantly, the mechanical couplings used with the homing connection system had to resist substantial tension, so that a shaft somewhat comparable to shaft 21 in FIG. 2a could be "dragged" or pulled leftwardly in FIG. 2a when the turret moves in the negative Z direction, toward the headstock. The requirement that a detachable rotary mechanical coupling be capable of resisting both tension and compression adds considerably to its expense, and tends to require that added devices by provided to latch and unlatch it. It will be seen that all of these problems are obviated in the present invention by the provision of assembly PA affixed to the drive table DT by arm 15. No matter how rapidly the turret moves connectors 39 and 40 leftwardly in FIG. 2a, their coupling to devices 23c and 31 tends to be completely unaffected, since assembly PA will move leftwardly with the same acceleration as the turret, and no tension will appear between any pair of connector halves. Instead, increased tension will appear in hose 34 and cable 39, and a pull will be exerted on shaft 21, but these forces need only be resisted by arm 15, and not any of the couplings or connectors. It will be readily apparent that the arm 15 can easily be made as stiff as desired. Thus the provision and mounting of assembly PA completely eliminates any need that any coupling between turret 10 and assembly PA be required to resist tension, which is an important feature of the invention.

It will be readily apparent that one half of a conventional quick-detachable automatic-shutoff hydraulic or pneumatic connector could instead be readily mounted in housing 31a in lieu of electrical wires and prongs and a hydraulic or pneumatic hose substituted for cable 29, so that hydraulic or pneumatic power would be connected to connector 40. It will be apparent that in some applications, hose 34 could apply pressure to such a connector as well as to cylinder 36, assuming the turret-carried device hydraulically or pneumatically powered by such an arrangement did not cause a pressure reduction in hose 34 sufficient to allow uncoupling to occur. In FIG. 2a a hole 36a through the wall of cylinder 36 allows air to escape from the cylinder on one side of the piston as the piston moves leftwardly. If another hydraulic (or pneumatic) hose (not shown) similar to hose 34 is connected to hole 36a, and the end of piston rod 36 is affixed to plate 26, as by bolting or welding, it will be apparent that cylinder 36 will be double-acting, so that connector 31 may be returned by pressurizing the added hose, in which case springs 27 and 33 could be eliminated. If such a double-acting arrangement is desired for shaft 23, means attached to plate 26, such as a ring having the profile shown in phantom at 26a may be provided to engage flange 23b to move shaft 23 rightwardly.

Figures 3A, 3B:
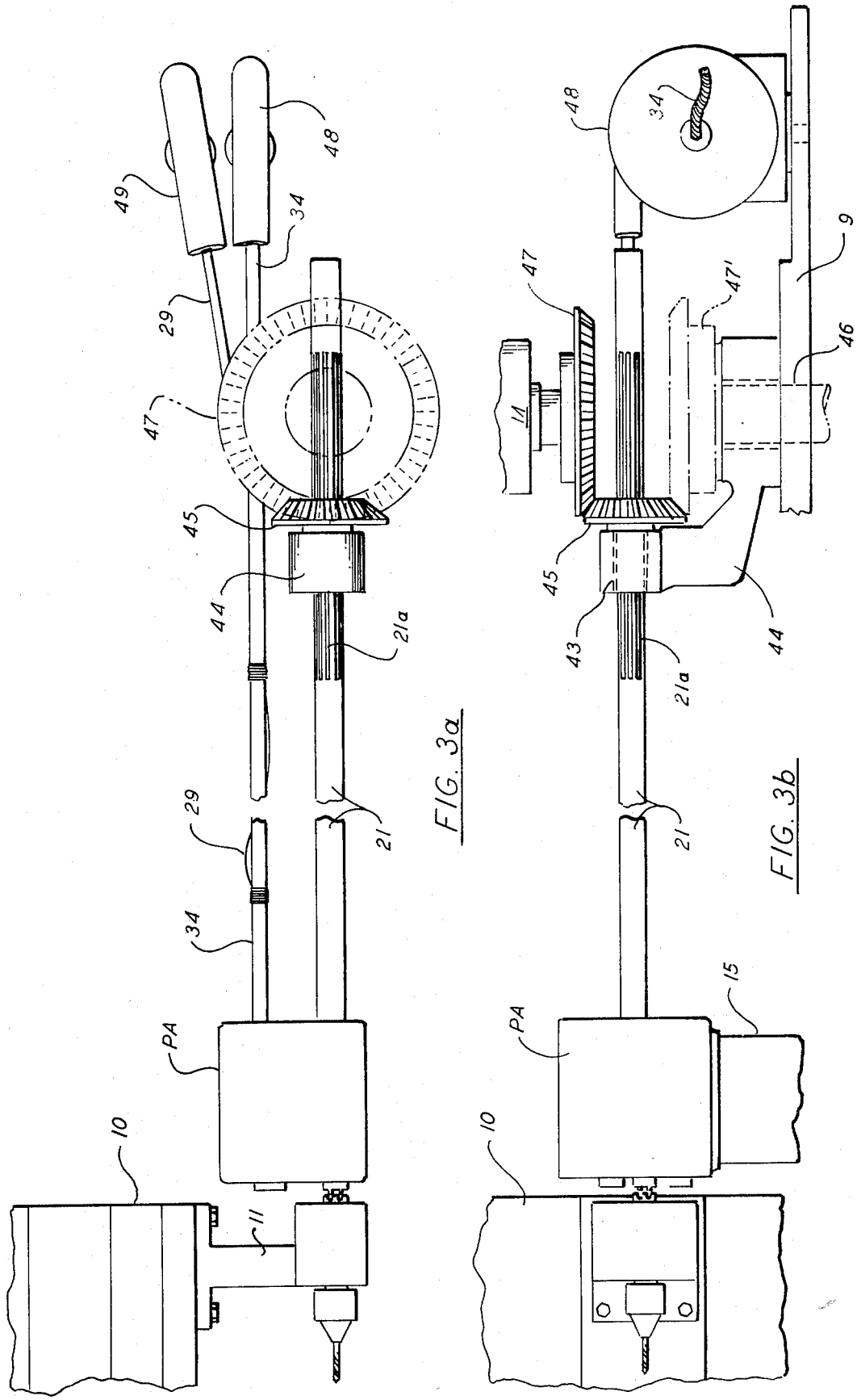
FIGS. 3a and 3b are top and side elevation views, respectively, illustrating one form of extensible and flexible power-connection means according to the invention.

A preferred manner in which mechanical, electrical and fluid power may be routed to assembly PA from power sources fixed relative to the machine base will become apparent from a consideration of FIGS. 3a and 3b. Shaft 21 extends horizontally rearwardly from assembly PA through bearing 43 in a horizontal bore of bracket 44 and therebeyond, and a bevel gear 45 having an internally splined bore slidingly meshes with a splined portion 21a of shaft 21. A vertical post 46 fixed in the machine base 9 pivotally carries bracket 44. Drive motor M is fixedly supported relative to the base and drives bevel gear 47 which meshes with gear 45. As turret 10 and assembly PA are driven in the Z direction, the splined portion 21a of shaft 21 slides rightwardly or leftwardly through gear 45, and as they are driven in the X direction, bracket 44 and gear 47 rotate about the axis of post 46, which coincides with the axes of gear 47 and the motor shaft, with a slight longitudinal movement of the shaft 21 splines through gear 45. Hydraulic hose 34 and electrical cable 29 are shown laced together for a portion of their length and then routed to two spring-operated retractable reels 48, 49, each of which is preferably arranged to be free to pivot slightly about a vertical axis. The hose and cable then lead from the reels to hydraulic (or pneumatic) and electrical equipment (not shown) which may be mounted in cabinet CC or in any convenient place on or adjacent the machine.

As suggested by a bevel gear 47' shown in dashed lines, drive motor M can instead be positioned below bracket 44, with the bracket pivoting about the motor shaft. Indeed, as shown in FIG. 3c, two bevel gears 47 and 47' can be provided, each connected to a separate motor M1 or M2 through a respective clutch CL1 or CL2, so that shaft 21 may be selectively driven by either one of the motors. A gearbox may be used if desired, of course, on the output shaft of any motor or clutch used to drive shaft 21. In FIG. 3c motor M1 is shown connected to clutch CL1 through a gearbox GB1, while motor M2 is shown connected directly to gearbox GB2, which is connected through clutch CL2 to drive bevel gear 47'. In FIG. 3, because the shafts driving bevel gears 47 and 47' coincide with the vertical axis of rotation of bracket 44, none of the structure used to drive those shafts need swing as the turret moves in the X or Z directions, and the housings of any or all of the motors, gearboxes and clutches shown in FIG. 3c hence may be fixedly attached to the base frame of the machine, by means of simple brackets (not shown).

In some applications, such as where a lathe is capable of very lengthy travel in the X direction, it becomes desirable to limit or decrease the amount which the extensible and flexible mechanical power connection means will flex. In FIG. 2a some power is wasted, and more wear of coupling 22 results, when the axis of shaft 21 extends at an angle from shaft 23, so it is desirable in general to maintain that angle small. For a turret having a given X travel distance, the maximum amount which U-joint coupling 22 in assembly PA must flex depends upon the distance between the assembly PA and the vertical pivot axis of bracket 44, and the U-joint coupling need flex very little if shaft 21 is made very long and the pivot axis of bracket 44 is situated far enough from the rightward Z limit position of the turret that assembly PA never closely approaches the bracket. It is desirable, however, that shaft 21 not be made longer than need be. Flexing of shaft 21 could be completely avoided, of course, by supporting the drive motor on or from the servo X-Y table DT, but such an arrangement has numerous disadvantages in many applications. FIGS. 4a and 4b illustrate an alternative form of extensible and flexible mechanical power-connection means wherein deflection of shaft 21 from the Z axis direction is maintained at a small angle, even for large movements of the turret in the X direction. Shaft 21 slidingly extends through a bearing in pedestal 51 and through internally splined gear 45. Gear 45 is driven by a bevel gear 52 having two beveled faces, gear 52 being carried on a stub shaft 53 having its ends rotatably journalled in plate 54 and bracket 55. The right-angle bracket 55 maintains a further bevel gear 56 in engagement with the lower beveled face of gear 52. Gear 56 has an internally splined bore and is carried on splined shaft 57 of motor M. Thus motor M drives shaft 21 via gears 56, 52 and 45, thereby transmitting power to the assembly PA to which shaft 21 extends. When the turret moves in the Z direction, a splined length of shaft 21 slides through gear 45, in generally the same manner as in FIGS. 3a–3b. Pedestal 51 is mounted for slight rotatable and sliding motion on plate 54, however, and includes a shaft portion 51a which extends through an arcuate slot 54b (FIG. 4a), shown in exaggerated size in plate 54, to operate electrical control means 58 carried on plate 54. Control means 58 may comprise a simple SPDT switch in some embodiments. When the turret translates in the X direction one way or the other from a central X position, shaft 21 will slightly rotate and move pedestal 51, thereby operating control means 58 to energize motor KM to rotate in one direction or the other. Motor KM is affixed to the machine base frame 9, and its shaft 60 threadingly engages a tab 54a on plate 54. Rotation of motor KM moves plate 54, and gears 45, 52 and 56, in the X direction, with plate 54 being guided by ways 61 shown as comprising ledges at the edges of an aperture in the base frame. Thus motor KM causes the right end (in FIGS. 4a, 4b) of shaft 21 to follow the left end in the X direction as the left end is moved by the turret, with a slight positional lag dependent upon the amount of movement of pedestal 51 required to operate control means 58. The lag will be seen to have no effect upon movement of the turret, however, and only to allow a small flexing of the U-joint coupling operated by shaft 21. If desired, the amplified error signals which drive the X drive motor (not shown) of table DT also may be connected to drive motor KM in addition to switching means 58, but there is no need to position plate 54 with the accuracy with which the table DT must be positioned. In FIG. 4c control means 58 is shown as comprising a simple leaf-spring switch of known construction. As shaft 51a moves upwardly in FIG. 4c from the centered position shown, it first deflects leaf c against leaf b to which power is connected, connecting power through resistor R1 to field F of motor KM, causing the motor to drive in one direction at a slow speed. If shaft 51a moves further upwardly in slot 54b (which could occur if drive table DT were slewed rapidly in the X direction so as to cause a substantial initial flexing of the U-joint coupling), leaf b then engages leaf a, shorting out resistor R1 so that motor KM will position plate 54 at a greater speed. Additional leaves and resistors may be added to provide as many different speeds for motor KM as may be desired. Converse operation which occurs to run motor KM in the opposite direction using field winding R if shaft 51a is moved downwardly in FIG. 4c will be evident without further explanation. Plate 54 may be carried on balls (not shown) to slide along ways 61 with decreased friction, if desired.

It may be noted that with support plate 54 in a given position, movement of the turret in the X direction will both rotate bearing pedestal 51 about its own vertical axis and translate the pedestal in the arcuate slot 54b. Control means 58 may be arranged to sense either the rotation or the translation, or both the rotation and translation of pedestal 51, since either is a measure of the angle of shaft 21. It will be readily apparent that a double-acting hydraulic or pneumatic piston-cylinder assembly (not shown) controlled by solenoid valves (also not shown) could be readily used in lieu of electrical motor KM to position support plate 54. It may be noted that support plate 54 need not be shiftable precisely in the X direction, but only in a direction which has a substantial X component, although no advantage is seen in arranging plate 54 to move other than in the X direction.

In FIG. 2b a modified form of power connection assembly PA' includes a housing 62 having pins 63 which slidingly support a ring 64 connected to the outer shell 65a of an electrical plug connector 65, the internal construction of which may resemble that of connector 31 of FIG. 2a. A portion of connector 65 passes through electro-magnet coil 66 and carries a rear ring 67 of magnetic material. Spring 68 normally urges connector 65 and ring 67 rearwardly against stop pins 69 affixed to housing 62. Several wires of cable 29 ' are connected to coil 66 and when those wires are energized, ring 67 is drawn into magnet 66, compressing spring 68 and extending the prongs of connector 65 out through opening 62a to engage mating recesses in a turret-carried female plug connector 70. Upon de-energization of the magnet coil, spring 68 returns connector 65 rightwardly. Cable 29 is shown connected to the rear of housing 62 with a conventional strain relief cable connector 71.

Shaft 21 is connected to one half of U-joint coupling 22', the forward end of which is shown journalled in housing 62 by bearing 72, and carrying a non-circular boss which slidingly extends into a mating recess in shaft 23'. Pin 23d' extends into slots such as 22b' to maintain the boss in the recess. Shaft 23' carries an annular flange 23b' which is urged leftwardly in FIG. 2b by spring 76, so that the toothed end of shaft 23 normally extends outwardly from housing 62 sufficiently far to engage a mating toothed end of a spindle 73 carried on the turret. Shaft 23' passes through magnet coil 74 and carries a ring 75 of magnetizable material. Magnet coil 74 is also connected to several wires of cable 29'. When coil 74 is energized, core 75 is drawn rightwardly in FIG. 2b, disconnecting the toothed end of shaft 23'. Thus the end of shaft 23 will engage the cooperating end of any turret-carried spindle indexed to the m axis if coil 74 is de-energized. Coil 74 is energized while indexing of turret 10 is occurring to prevent the two toothed ends from striking before they are axially aligned with each other. A microswitch MS is linked to ring 75 to provide a signal indicating whether shaft 23' has translated far enough leftwardly to fully engage the end of spindle 73.

Figure 2D:
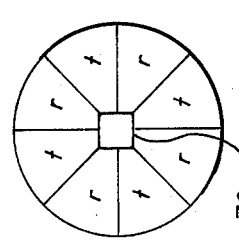
FIGS. 2c and 2d are geometrical diagrams illustrating the construction of an exemplary form of mating coupling devices according to the invention.
Figure 2C:
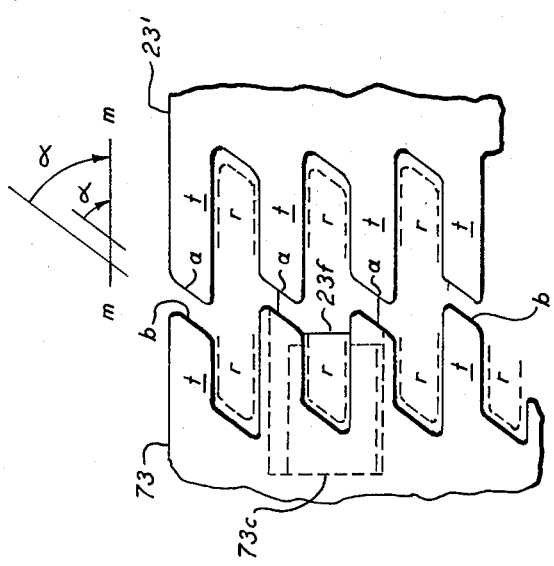

One manner in which the toothed end 23c and the spindle 39 of FIG. 2a, and the toothed end of shaft 23' and spindle 73 of FIG. 2b, may be shaped will become more clear from a consideration of FIGS. 2c and 2d. In FIG. 2c end portions of spindle 73 and the end of shaft 23' are shown "unrolled." Each includes a plurality of teeth *t* spaced around its periphery separated by recesses *r* having a very slightly greater angular width than the teeth. The ends of the teeth on the two devices are shaped to slope at an angle shown as α from the *m* axis. If shaft 23' is moved leftwardly in FIG. 2*c*, so that the ends *a, a* of its teeth strike ends *b, b* of teeth on spindle 73, it will be apparent that spindle 73 and/or shaft 23' will be forced to rotate relative to each other, so that the teeth of each device can enter the recesses of the other device, thereby effecting driving engagement. Shaft 23' includes a non-circular central boss 23*f,* and spindle 73 includes a cooperating non-circular recess 73*c.* As shaft 23' moves leftwardly, when the two devices have been relatively rotated so that the teeth of each will enter the tooth recesses of the other, boss 23*f* will be properly angularly aligned to enter recess 73*c.* The depth of recess 73*c* is related to the length of boss 23*f* so that the boss 23*f* will strike the bottom of recess 73*c* before the sloped ends of the teeth can engage the ends of the tooth recesses. The positions of teeth in the tooth recesses during full engagement are shown in dashed lines. Importantly, when the devices are fully engaged, no two mating surfaces of the two devices extend in planes not parallel or perpendicular to the *m* axis, and thus transmission of torque from shaft 23' to spindle 73 does not produce a force tending to urge shaft 23' rightwardly in FIG. 2*c.* Such an arrangement will be seen to allow small and inexpensive actuating means (e.g. 36, 27 and 33 in FIG. 2*a,* and 66, 74, 68 and 76 in FIG. 2*b*) to effect engagement and disengagement of rotary mechanical power. It is important to note that shaft 23' need not be rotated by a drive motor in order to couple to spindle 73, and that neither shaft 23, spindle 73 nor any part associated therewith need be braked to accomplish coupling and uncoupling. Also, since no space need be provided between engaging surfaces for radial movement of balls or like latching means required in prior detachable couplings heretofore suggested for use with the homing connection system, it will be apparent that the mating surfaces of shaft 23' and spindle 73 can be arranged with close tolerances, to operate with very little backlash when that is desired.

While the invention has been described thus far in connection with a turret lathe having its turret indexing axis arranged parallel to its workpiece axis, it should be noted that the invention is applicable as well to various other forms of turret lathe, such as those having vertical turret indexing axes, or slant-bed lathes such as the "Star-Turn" 8-15 N/C Lathe sold by Pratt and Whitney Machine Tool Division of Colt Industries Operating Corporation, West Hartford, Conn. FIG. 5 is a plan view diagram illustrating an arrangement which includes a two-turret lathe, such as the Le Blond 12/12 NC lathe sold by Le Blond Incorporated of Cincinnati, Ohio. Headstock HS carrying chuck CH rotates workpiece W about axis C. A two-axis table DT' translatable in the X and Z directions carries two turrets 10*a* and 10*b,* front turret 10*a* being a horizontal turret indexable about a vertical axis T₁ and rear turret 10*b* being a vertical turret indexable about a horizontal axis T₂. In accordance with the invention, one may provide a power-coupling assembly for one, or one for each of the two turrets. In FIG. 5 a power-coupling assembly PA1 is shown mounted near front turret 10*a* and supported from table DT' by bracket 15*a* while power-coupling assembly PA2 is supported near rear turret 10*b* by bracket 15*b,* which passes below turret 10*b* and is rigidly affixed to table DT'. The PA2 assembly may take the form shown in FIG. 2*a,* or that shown in FIG. 2*b,* for example. Each power-coupling assembly is shown connected via a respective shaft 21 to a power connection means PC1 or PC2, each of which is shown as a simple block, but each of which may take the form of extensible and flexible power-connection means shown in FIGS. 3*a*–3*b,* or FIG. 3*c,* or FIGS. 4*a*–4*b,* for example.

In FIG. 5 two assemblies carried on two of the vertical faces of turret 10*a* are shown diagrammatically as simple blocks 11'. Blocks 11' may be deemed to represent coupling-half holders and tool holders, and tools or other devices which it is deemed desirable to carry on the turret faces. If assembly PA1 were located at generally the same vertical level as assemblies 11', the assemblies 11' would tend to strike the assembly as the turret rotated, unless one mounted assembly PA1 a great enough radial distance from axis T₁. However, mounting the assembly PA1 far enough from axis T₁ undesirably increases the distance which the assembly must translate a coupling half to engage a mating coupling half then in working position. To obviate these problems, assembly PA1 is generally spaced above the faces of turret 10*a,* and arranged to extend one or more coupling halves downwardly to engage one or more mating coupling halves carried on each face of turret 10*a,* as shown in an exemplary manner in FIG. 5*a.* In FIG. 5*a* a face of turret 10*a* in working position is indicated by the rectangle at 80. Housing 81 bolted to the turret face carries a horizontally-extending shaft 82 which extends in the X direction when the turret face is in working position, shaft 82 being journalled in the housing by several bearings (not shown), and extending forwardly through the housing to carry a chuck or like tool-holding device (not shown). Bevel gear 83 on shaft 82 engages bevel gear 84 on vertically-extending shaft 85 also journalled in the housing, and the upper end of shaft 85 is shaped to comprise a coupling half, in the manner of coupling half 73 of FIG. 2*c,* for example. Assembly PA1 is shown as comprising a housing 86 having a horizontally-extending shaft 87 journalled in plate 88 and attached to the forward end of U-joint coupling 22, the rear end of which is attached to shaft 21. A vertically-extending shaft 89 rotatably and slidingly journalled in bearings in brackets 90 and 91 includes a toothed end 89*a* adapted to drivingly engage the upper end of shaft 85. Compression spring 92 urges a ring 93 against a flange portion 89*b* of shaft 89, thereby urging shaft 89 upwardly. A portion of shaft 89 passing through bevel gear 94 is splined, as at 89*c,* and the upper end of shaft 89 is engaged by a linear actuator LA, which may comprise a hydraulic or pneumatic piston-cylinder assembly, or an electrical solenoid, for example. Bevel gear 95 carried on the end of shaft 87 engages bevel gear 94. The action of spring 92 will be seen to normally separate the toothed ends of shafts 85 and 89, but when actuator LA is operated shaft 89 is extended downwardly to drive the assembly carried on the turret face 80. It may be noted that actuator LA in FIG. 5*a* need not pull or drag the weight of shaft 21 even though no sliding connection comparable to the boss 23*a*-recess 22*a* connection of FIG. 2*a* is used.

Figure 5A:
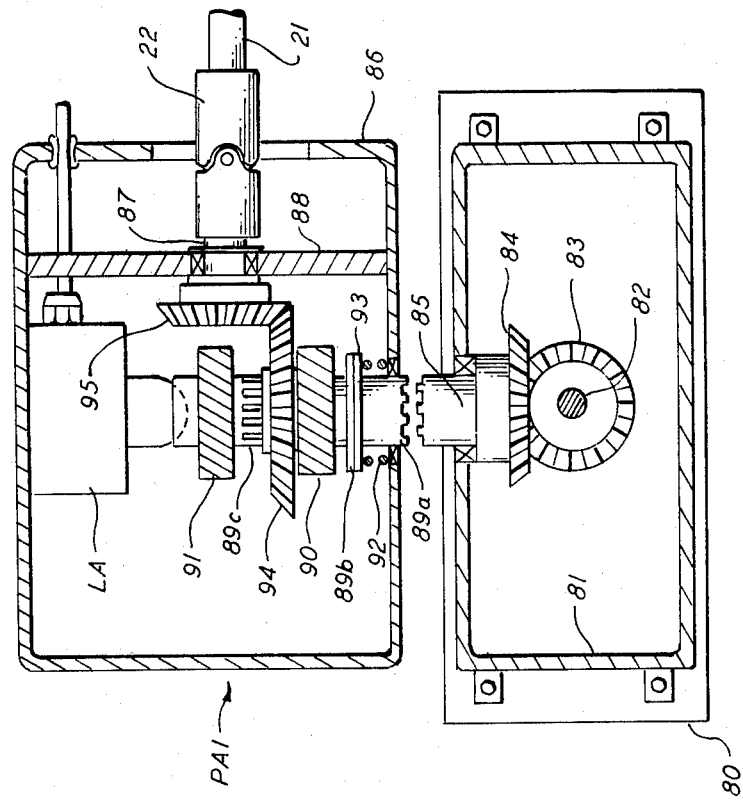
FIG. 5a is a cross-section elevation view illustrating the power-coupling assembly PA1 of FIG. 5 in greater detail.
Figure 5:
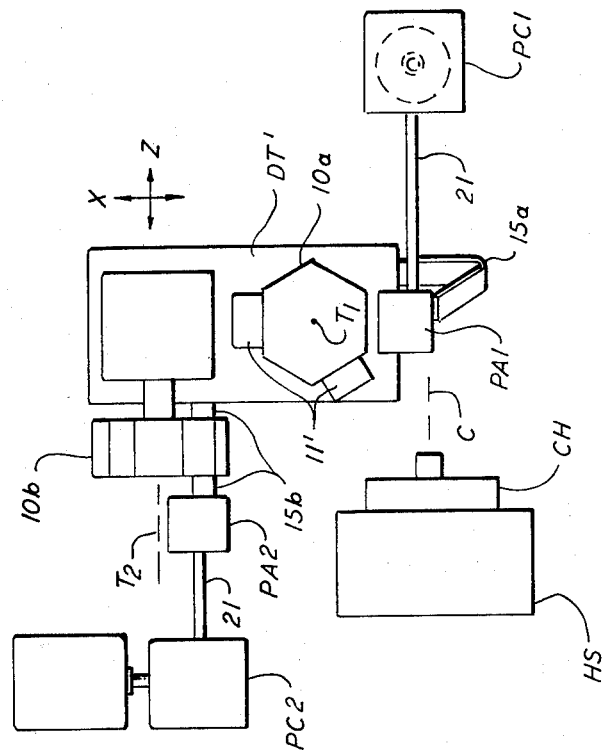
FIG. 5 is a diagrammatic plan view illustrating one manner in which the invention may be applied to a different form of turret lathe.
Figure 5B:
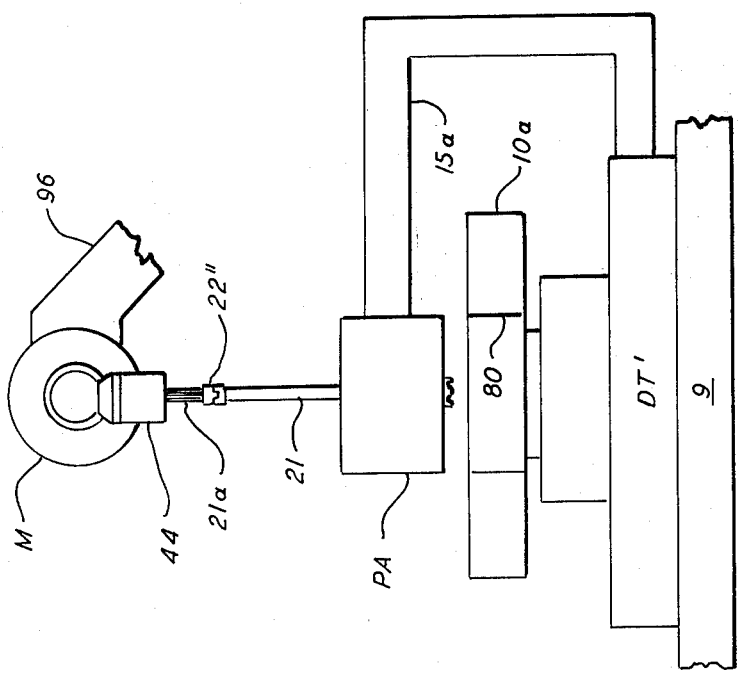
FIG. 5b is a diagrammatic side elevation view illustrating another form of the invention.

Upon reflection, it will become apparent that a right-angle change in drive direction such as that provided by gears 94 and 95 in FIG. 5*a* is not absolutely necessary to effect connection to assemblies carried on vertical turret faces. The power connection assembly of FIG. 2*a* or that of FIG. 2*b* could be mounted in the same position relative to turret face 80 as is shown for assembly PA1 in FIG. 5a if shaft 21 of the power-connection assembly of FIGS. 3a–3b or the assembly of FIGS. 4a–4b were arranged to extend vertically. Such an arrangement is shown diagrammatically in FIG. 5b, a side elevation view looking in the X direction. The bracket means 15a which fixedly supports the assembly PA relative to the drive table DT' must extend upwardly to assembly PA at a large enough radial distance from the turret indexing axis so that tool-holders, tools and like devices carried on the turret faces will not strike the bracket, as is also the case in FIGS. 5 and 5a, of course. Motor M and bracket 44 of the power-connection assembly are assumed to be fixedly positioned relative to the machine base 9 by a bracket 96. In the assembly of FIGS. 3a–3b, shaft 21 moves within one horizontal plane as the turret 10 moves in the X and Y directions, but in FIG. 5b it will be seen that shaft 21 must move in one vertical plane for X motion of turret 10a and in another perpendicular vertical plane for Z motion of turret 10a. To provide the required added degree of flexibility in FIG. 5b, a further U-joint coupling 22″ is inserted into shaft 21 near bracket 44. While assembly PA1 in FIG. 5a and assembly PA in FIG. 5b are shown spaced slightly above the vertical turret-face 80, it will be apparent that in some applications of the invention it will be deemed to mount such assemblies slightly below such turret faces, making it easier to support the drive motor M and bracket 44 on the base 9 of the machine.

Figure 6A:
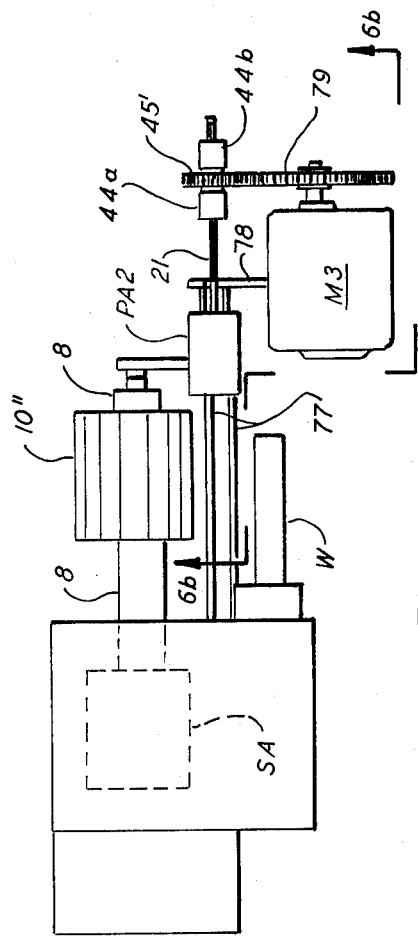
FIG. 6a is a top view illustrating one manner in which the invention may be applied to a further form of turret lathe.
Figure 6B:
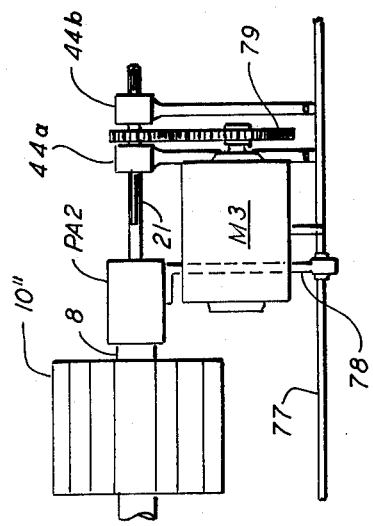

While the invention has been illustrated in connection with two-axis numerically-controlled lathes, it is important to note that the invention is applicable as well to single axis and three-axis lathes, and applicable to lathes which are controlled by mechanically-operated groups of switches, such as, for example, the single-spindle chucking automatic lathes (Models 0AC, 1AC, 2AC, 3AC and 4AC) and single-spindle-bar automatic lathes (Models 0AB, 1AB and 2AB) sold by The Warner and Swasey Company, Cleveland, Ohio 44103. FIGS. 6a and 6b diagrammatically illustrates a lathe of such a type wherein a workpiece W is rotated by a main spindle, and a turret 10″ carried on turret shaft 8 is indexable about a fixed turret axis T' and movable in the Z direction along with shaft 8. The forward (leftward in FIGS. 6a, 6b) portion of shaft 8 carries a plurality of switch actuators at SA, so that rotation and translation of shaft 8 operates a group of switches to automatically advance the lathe through a desired sequence of machining operations. It will become readily apparent at this point that a power-coupling assembly PA2 generally of the nature heretofore described may be attached to the end of shaft 8 to be translated but not rotated therewith, with the power-coupling assembly being connected to one or more power sources fixedly mounted relative to the machine base by one or more of the extensible, retractable and flexible power-connection means heretofore illustrated. However, since the shaft 8 does not move in the X direction, the power connection means may be simplified, so as to be extensible and retractable without being flexible. In the devices of FIGS. 2a and 2b, for example, the U-joint couplings 22 and 22' may be eliminated. In FIGS. 6a and 6b shaft 21 is splined along a portion of its length to engage mating internal spines of gear 45' which need not rotate about a vertical axis and is thus shown slidably mounted on shaft 21 between two bearing pedestals 44a, 44b. Coupling assembly PA2 is shown guided for slidable movement in the Z direction on bracket 78 which slides on guide rods 77, 77 fixed to the machine base frame. Gear 45' is driven via gear 79 on the shaft of motor M3, which is also fixed relative to the machine base frame.

While each power-coupling assembly PA has been described as being "permanently" affixed to a drive table DT (or to turret shaft 8 in FIGS. 6a, 6b), that term is to be understood as meaning that such an assembly is affixed during the time that plural machining operations take place. It will be apparent that an assembly such as that of FIG. 2a or FIG. 2b may be bolted or clamped to arm 15 so as to be removable therefrom and movable toward the power sources when not in use. In FIG. 3a, it will be apparent that if assembly PA is not fixed relative to turret 10, it may be readily slid over toward and adjacent bracket 44, if the splined portion of shaft 21 is arranged to extend far enough leftwardly on shaft 21, or if the portion of shaft 21 to the left of the portion shown splined in FIG. 3a is provided with a lesser diameter so that it can be slid rightwardly through bearing 43 and gear 45.

While use of the power-connection means of FIG. 4a–4c has been described in connection with a power-coupling assembly PA which is carried with a turret on a drive table, upon reflection it will become apparent that it also may be used with the previously-mentioned homing connection system wherein the turret moves a detachable coupling on the left (in FIGS. 3a, 3b, 4a, 4b) end of shaft 21 to some predetermined X and Z position to effect coupling and uncoupling. Thus the arrangement of FIGS. 4a–4c may find general utility in applications where rotary power must be connected from a motive means which is fixedly mounted on a frame to a rotatable spindle which must translate in two directions relative to the frame.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

I claim:
1. In a turret lathe having a machine base, headstock means fixedly mounted on said base and operable to continuously rotate a workpiece about a first axis, a turret rotatably indexable about a second axis to a plurality of discrete index positions to selectively present successive tools carried on said turret to said workpiece, means for indexing said turret about said second axis, and means for translating said turret relative to said base in a first coordinate direction parallel to said first axis whereby one or more of said tools carried on said turret may perform turning operations on said workpiece as said workpiece is rotated by said headstock means, the combination of: a first power-coupling device carried on said turret and connected to power a first tool carried on said turret, a power-coupling assembly having a base portion spaced a predetermined distance from said turret and mounted to be translated simultaneously and equally with said turret, said turret being rotatable about said second axis relative to said power-coupling assembly, said power-coupling assembly including a second power-coupling device movably mounted relative to said base portion and actuator means affixed to said base portion, said actuator means being operable to extend and retract said second power-coupling device from and toward said base portion of said assembly to engage and disengage said second power-coupling device with and from said first power-coupling device, a power source mounted on said base at a fixed distance from said headstock means, and power-connection means extensible in said first coordinate direction for transmitting power from said power source to said second power-coupling device.

2. The combination according to claim 1 wherein said means for translating said turret includes a table upon which said turret and said power-coupling assembly are mounted, and motive means for translating said table in said first coordinate direction and in a second coordinate direction perpendicular to said axes.

3. The combination according to claim 2 wherein said motive means are operable to translate said table and said power-coupling assembly in a third coordinate direction perpendicular to said first and second coordinate directions.

4. The combination according to claim 2 having a second turret and a second power-coupling assembly carried on said table, a third power-coupling device carried on said second turret and connected to power a tool carried on said second turret, said second power-coupling assembly including a fourth power-coupling device and second actuator means operable to extend and retract said fourth power-coupling device from and toward said second assembly to engage and disengage said third and fourth power-coupling devices, a second power source mounted on said base, and a second extensible power connection means interconnecting said second power source and said fourth power-coupling device.

5. The combination according to claim 1 wherein said first and second power-coupling devices comprise a mating pair of rotary mechanical elements adapted to drivingly engage each other upon extension of said second device against said first device.

6. The combination according to claim 5 wherein said first and second power-coupling devices are adapted to engage each other without latching, whereby said devices may be disengaged by retraction of said second device by said actuator means.

7. The combination according to claim 5 wherein said pair of elements include a plurality of mating surfaces lying in planes substantially parallel to and a pair of mating surfaces perpendicular to the axis of rotation of said elements, whereby transmission of torque from one of said elements to the other of said elements does not create a substantial force tending to move said elements apart in the direction of said axis of rotation.

8. The combination according to claim 5 wherein one of said elements includes a recess having a plurality of internal surfaces and the other of said elements includes a boss having a plurality of external surfaces, said boss being adapted to enter said recess so that said external surfaces engage said internal surfaces, a plurality of said surfaces lying in planes substantially parallel to and a pair of said surfaces lying in a plane perpendicular to the axis of rotation of said elements.

9. The combination according to claim 1 having a third power-coupling device mounted on said turret and connected to power a second tool on said turret, said second power-coupling device being extensible from said power-coupling assembly to engage said first power-coupling device when said turret has been indexed to a first of said index positions and being extensible from said power-coupling assembly to engage said third power-coupling device when said turret has been indexed to a second of said index positions.

10. The combination according to claim 1 having a third power-coupling device mounted on said turret and connected to power a second tool on said turret, said power-coupling assembly including a fourth power-coupling device extensible from said assembly to engage said third power-coupling device.

11. The combination according to claim 10 wherein said power-coupling assembly includes a second actuator means operable to extend and retract said fourth power-coupling device.

12. The combination according to claim 10 wherein said actuator means is operable to extend and retract said second and said fourth power-coupling devices simultaneously.

13. The combination according to claim 1 wherein said actuator means is operable to extend and retract said second power coupling device along an axis parallel to said first axis.

14. The combination according to claim 1 wherein said actuator means is operable to extend and retract said second power-coupling device along an axis parallel to said second axis.

15. The combination according to claim 1 wherein said extensible power-connection means includes splined shaft means, a universal-joint coupling connecting said second power coupling device to said splined shaft means, said power source including a rotary output shaft, and gear means slidingly engaging said splined shaft means to transmit torque from said rotary output shaft to said splined shaft means.

16. The combination according to claim 15 wherein said gear means comprises a first gear slidingly engaging said splined shaft means, a second gear affixed to said output shaft, and gear support means for maintaining said first gear in engagement with said second gear.

17. The combination according to claim 16 wherein said gear support means is mounted to pivot about an axis coinciding with the axis of said second gear.

18. The combination according to claim 15 wherein said power-connection assembly includes a first gear connected to be driven by said splined shaft means, a second splined shaft means carrying said second power-coupling device on one of its ends, a second gear engaging said first gear and slidingly engaging said second splined shaft means, said actuator means being connected to translate said second splined shaft means.

19. The combination according to claim 15 wherein said power-connection assembly includes a pair of bevel gears and said actuator is operable to extend said second power-coupling device in a direction generally perpendicular to the axis of said splined shaft means.

20. The combination according to claim 15 wherein said gear means comprises a first gear slidingly engaging said splined shaft means, a second gear engaging said first gear, a third gear slidingly engaging said output shaft, said output shaft being splined and said second gear engaging said third gear, gear support means for maintaining said second gear in engagement with said first and third gears, and means responsive to angular movement of said splined shaft means for translating said gears and gear support means in a direction parallel to said output shaft to limit said angular movement of said splined shaft means.

21. The combination according to claim 1 wherein said actuator means includs an expansible chamber motive means connected to be operated by a source of fluid pressure.

22. The combination according to claim 1 wherein said actuator means includes spring means operative to retract said second power-coupling device from said first power-coupling device.

23. The combination according to claim 1 wherein said actuator means includes spring means operative to extend said second power-coupling device toward said first power-coupling device.

24. The combination according to claim 1 wherein said actuator means includes an electrically-operated magnet coil.

25. The combination according to claim 1 wherein said power source comprises a motor mounted at a predetermined location on said base and said extensible power-connection means comprises gear means slidably engaging splined shaft means for applying torque from said motor to said second power-coupling device.

26. The combination according to claim 25 having a second motor mounted on said base, and clutch means for selectively connecting said motor at said predetermined location or said second motor to drive said splined shaft means.

27. The combination according to claim 1 wherein said power source comprises an electrical source, said extensible power-connection means comprises a flexible electrical cable, and said first and second power-coupling devices comprise a pair of mating electrical connectors.

28. The combination according to claim 27 having a retractable cable reel mounted on said base to reel said electrical cable in and out as said power-coupling assembly moves relative to said base.

29. The combination according to claim 27 wherein said actuator comprises an electromagnet and said electrical cable includes conductors connected to energize said electromagnet.

30. The combination according to claim 1 wherein said first power-coupling device is rotatably and non-translatably mounted on said turret.

31. The combination according to claim 1 wherein said first power-coupling device is non-rotatably and non-translatably fixed to said turret.

32. The combination according to claim 1 wherein said power source comprises a hydraulic source, said extensible power-connection means comprises a flexible hydraulic hose, and said first and second power-coupling devices comprise a pair of mating hydraulic connectors.

33. The combination according to claim 1 wherein said power source comprises a pneumatic source, said extensible power-connection means comprises a flexible pneumatic hose, and said first and second power-coupling devices comprise a pair of mating pneumatic connectors.

34. The combination according to claim 1 wherein said actuator is operable to extend said second power-coupling device into engagement with said first power-coupling device to rotate said first device without translating said first device relative to said turret.

* * * * *